United States Patent [19]
Johnson

[11] 4,025,210
[45] May 24, 1977

[54] SHAFT ASSEMBLY

[75] Inventor: Carl B. Johnson, Pontiac, Ill.

[73] Assignee: Pontiac Furniture Industries, Inc., Pontiac, Ill.

[22] Filed: July 10, 1975

[21] Appl. No.: 594,598

[52] U.S. Cl. .............................. 403/240; 403/373; 403/383; 292/306

[51] Int. Cl.² .......................................... F16B 1/00

[58] Field of Search .......... 403/240, 230, 330, 350, 403/373, 374, 383, 261; 339/274, 239, 240; 292/349, 354, 305, 306; 269/203, 204, 287

[56] References Cited

UNITED STATES PATENTS

| | | | |
|---|---|---|---|
| 1,888,238 | 11/1932 | Moore | 292/349 X |
| 2,026,454 | 12/1935 | Benzing | 403/261 X |
| 2,189,865 | 2/1940 | Petersen | 403/240 |
| 2,724,815 | 11/1955 | Sisco | 339/273 R X |
| 3,023,473 | 3/1962 | Cochran | 24/221 R |
| 3,419,292 | 12/1968 | Peltret et al. | 403/261 |
| 3,515,062 | 6/1970 | Styles | 403/350 X |

Primary Examiner—Andrew V. Kundrat
Attorney, Agent, or Firm—Fitch, Even, Tabin & Luedeka

[57] ABSTRACT

The assembly of a shaft with a torque-applying or -resisting load member in which the shaft is provided with a non-circular cross-section at the site of the assembly and the load member has an aperture adapted to receive the shaft and to transmit to the shaft a torque in at least one direction, and the assembly is maintained by an attaching member which is mounted on the shaft adjacent to the load member, and is capable of transmitting a torque to the shaft opposed to that of the load member and the load and attaching members are biased in opposite directions rotationally of the shaft and fastened together.

4 Claims, 13 Drawing Figures

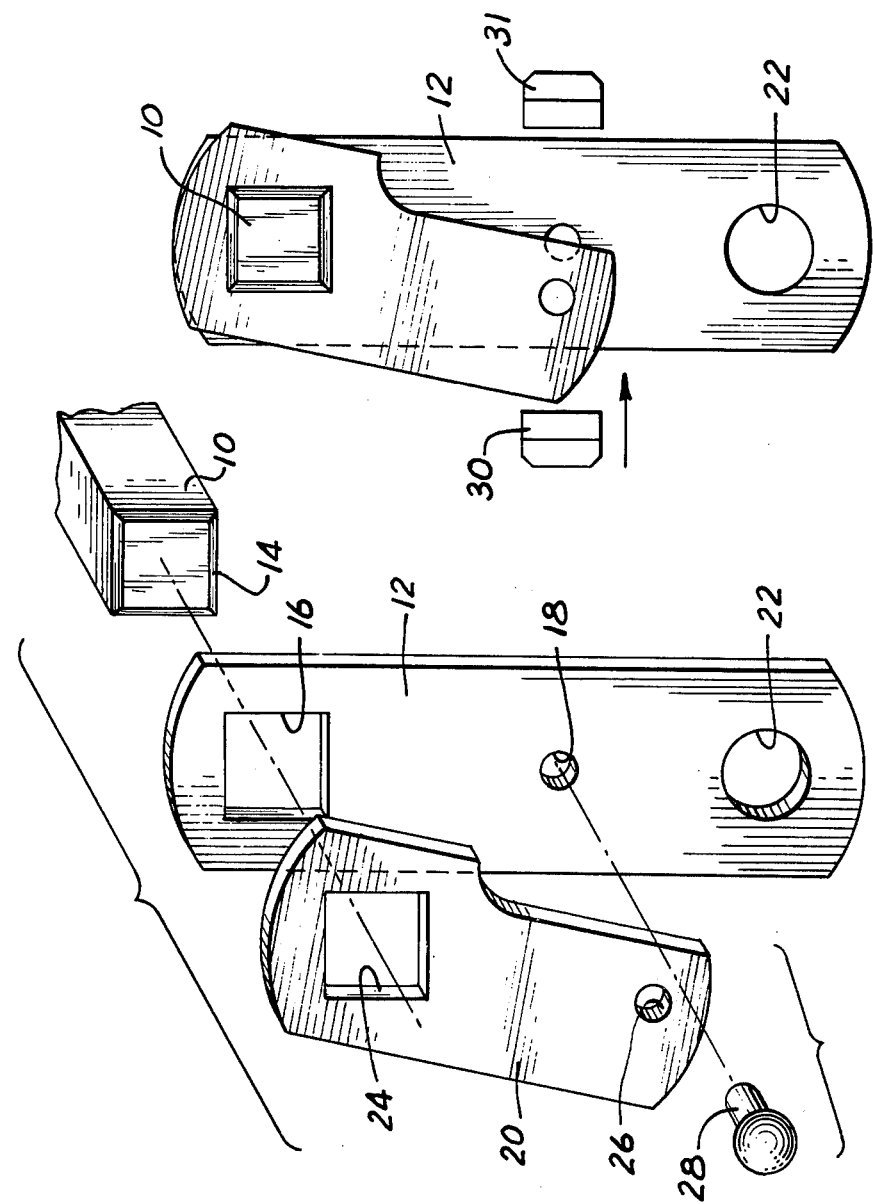

SHAFT ASSEMBLY

This invention relates to shaft assemblies for machines, implements, or structures in which the shaft and the members with which it is assembled are to maintain a fixed relationship to one another capable of transmitting or resisting torsional or axial loads applied either to the shaft or to the members with which the shaft is assembled.

The invention is particularly useful where the members with which the shaft is to be assembled are relatively thin compared to the cross-sectional dimension of the shaft, and where design limitations of space, cost, or weight rule out conventional assembly techniques.

Briefly, the invention contemplates that the shaft, at the site of its assembly with the other member or members if not throughout its length, will have a non-circular cross-sectional outline. The member with which it is to be assembled is provided with an aperture of conforming shape and of a size such as to have a slip fit onto the shaft. A second member, which may be thought of as an attaching member and which is provided with a similarly shaped and sized aperture is likewise placed on the shaft, preferably in facing contact with the first member. The two members are then rotated in opposite directions on the shaft with sufficient force to resiliently deform at least one of the three elements of the assembly, and the two members are then secured together to maintain their opposing torques upon the shaft.

The assembly of the invention will be understood from the following detailed description, taken in conjunction with the accompanying drawings of which FIG. 1 is an exploded isometric assembly drawing of the essential elements of one form of assembly in accordance with the invention;

FIG. 2 is an elevational view of the assembled elements of FIG. 1 prior to the forcible counterrotation of the two members to be assembled with the shaft;

FIG. 3 is an elevational view similar to FIG. 2, showing the two members after forcible counterrotation and attachment to each other;

Figures 6A, 6B:
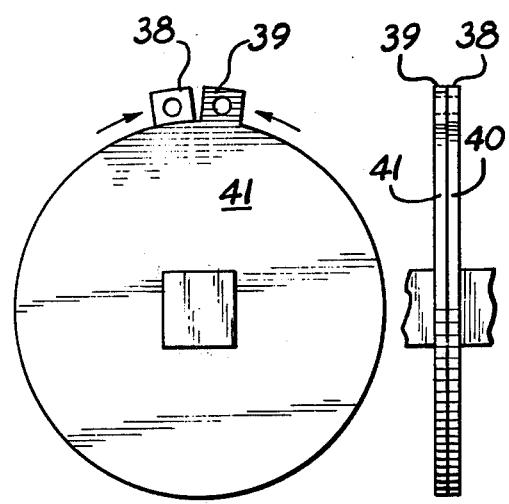
Figure 7A:
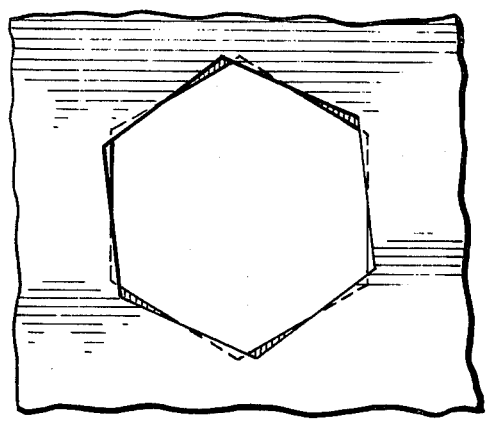
Figure 7D:
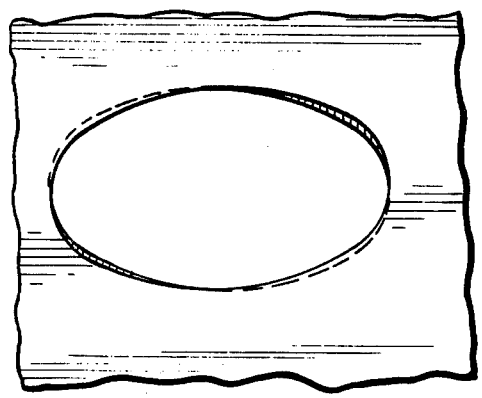

FIGS. 6a and b are front and side elevations of the invention in an axial thrust-applying or thrust-resisting situation; and FIGS. 7a and b inclusive are diagrammatic illustrations of a variety of non-circular shaft sections with which the invention may be employed.

Referring to FIGS. 1 to 4 of the drawings for a complete description of the shaft assembly of the invention as used in one commercial application, i.e., in the linkage of a reclining chair, the shaft 10 of the assembly serves as a torque rod which extends across the chair from side-to-side beneath the seat, and, by its assembly at opposite ends with corresponding arms 12 of two substantially identical linkages, unifies and coordinates the movement of the two linkages on opposite sides of the chair.

In this case, the cross-section of the non-circular shaft 10 is square, and the shaft may be solid or tubular depending upon the torsional load requirements. In FIGS. 1 to 4, the shaft 10 is shown as solid with a chamfered end 14 to facilitate assembly. The arm or load member 12 with which the shaft is assembled is formed of steel strap, die-cut round at its ends and punched to provide a square hole 16 to receive the shaft 10, and a smaller round hole 18 for its subsequent connection to the attaching member 20. A larger round hole 22 at the opposite end of the arm 12 is its point of pivotal attachment to the other members of the linkage of which it is a part.

As earlier indicated, the square hole 16 punched in the load member 12 is preferably sized for a convenient slip fit with the shaft 10. Drive, press, or other interference fit may also be used but is unnecessary as will shortly become clear.

The attaching member 20, in this instance also formed of similar strap stock, is similarly rounded at its ends and likewise punched with a square hole 24 at one end for assembly with the shaft 10, and spaced therefrom, with a small round hole 26 for its subsequent fastening to the load member 12. The fastener in the illustrated case is a rivet 28 which will serve to maintain the assembly.

It will be observed in FIG. 1 that the square hole 24 punched in the attaching member 20 is rotated slightly out of square with the central axis of the member so that, when the load member and the attaching member are assembled face to face on the shaft, their axes and edges are askew, and the rivet holes 18 and 26, equidistant from the centers of the square holes 16 and 24 in the two members, are out of alignment. To complete the assembly, the load member 12 and the attaching member 20 are forcibly rotated in opposite directions on the shaft until the rivet holes of the two facing members are brought into alignment for the insertion of the rivet, as indicated in FIG. 3.

Figure 4:
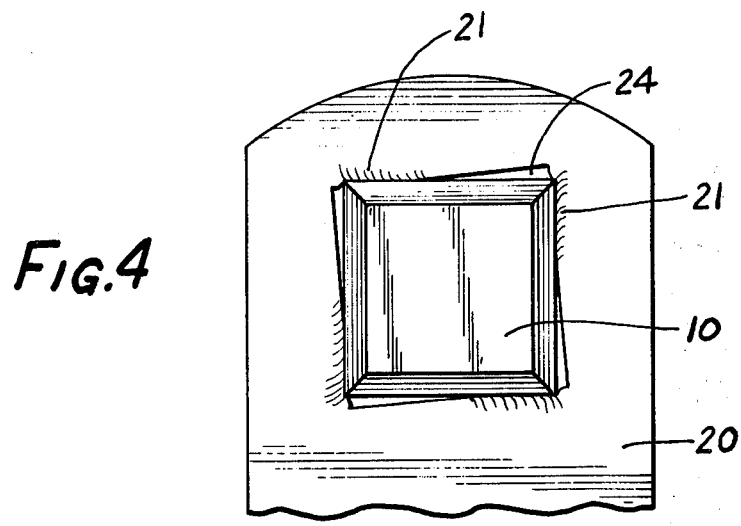
FIG. 4 is a fragmentary enlargement of FIG. 3 showing the distortion of the members as they grip the shaft after the counterrotation which occurs in the step from FIG. 2 to FIG. 3.

In the process, as also indicated in FIG. 3 and more clearly in the enlargement of FIG. 4, at least one of the three elements of the assembly is resiliently distorted. If, as is indicated in FIGS. 1 to 3 inclusive, the load member 12 and the attaching member 20 are of substantially the same stock and provide the same amount of material around the holes which receive the shaft, they will experience essentially equal and opposite distortions. For example, in the particular commercial chair-linkage application earlier referred to, in which the square shaft 10 was of mild steel 7/16 inches on the side, and the load and attaching members 12 and 20 were punched from 12-gauge hot rolled mild steel strap, both the load member 12 and the attaching member 20 exhibited opposite distortion 21 at the square holes, and the shaft 10 showed staggered coined marks (not shown) on opposite edges of each of its surfaces where the shaft had been gripped in torsional shear by the oppositely rotated members 12 and 20 with which it had been assembled.

The amount of counterrotation of the two members which may be required will obviously depend upon the nature of the fit of the holes with the shaft, and upon the amount of axial thrust which must be resisted. In the embodiment of FIGS. 1 to 4, which illustrate the application detailed in the preceding paragraph, the square hole 16 in the load member 12 is aligned with its sides respectively perpendicular to and parallel to the longitudinal axis of the member, whereas the square hole 24 in the attaching member 20 is rotated approximately 6 degrees from its longitudinal axis, both holes having a slip fit with the shaft. With the stated materials, and with the rivet holes 18 and 26 each spaced 1 9/16 inches from the center of the square holes which receive the shaft, the load member 12 and the attaching member 20 may readily be brought into alignment by the jaws 30–31 of a hand-held toggle-type pliers-vise (Fig. 2) to receive the securing rivet 28.

Figure 5:
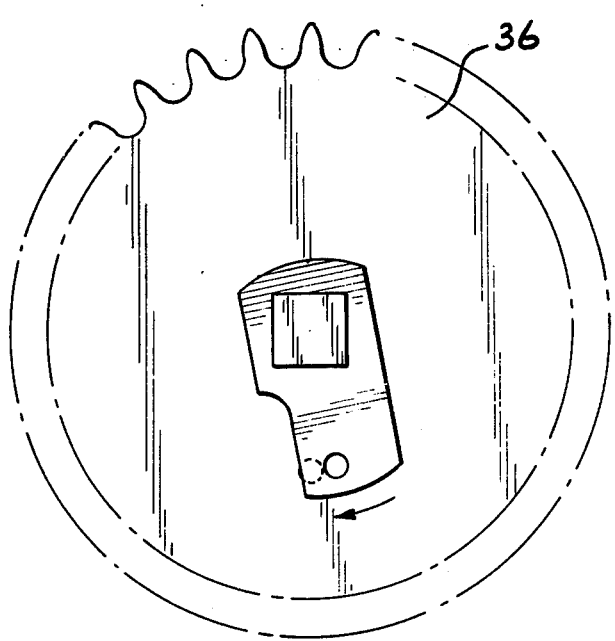
FIG. 5 is an elevation of the shaft assembly of the invention used in a torque-transmitting application.

While in FIGS. 1 to 4 the torque-transmitting or resisting load member is contemplated as an arm 12 on the shaft 10, the "arm" may take other forms as well, such as a gear or a sprocket 36, as illustrated in FIG. 5.

Similarly the grip of the oppositely rotated members on the shaft can be equally effective longitudinally of the shaft, and the assembly similarly employed as a thrust washer, (see FIG. 6a and 6b) for the transmission of axial load from the shaft to the washers, and vice versa. In FIGS. 6a and 6b, a pair of alignable edge tabs 38 and 39 are provided to secure the two washer members 40 and 41 together after they are rotated into alignment.

Figure 7B:
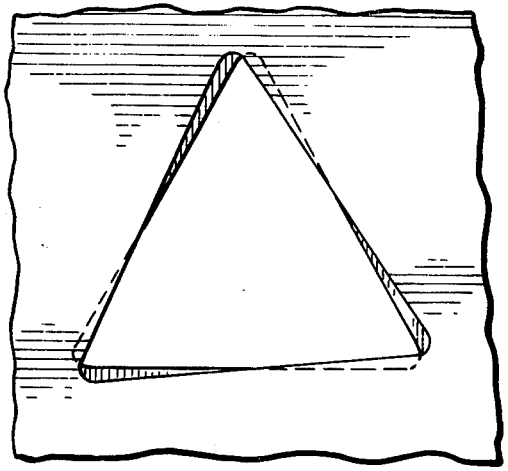
Figure 7E:
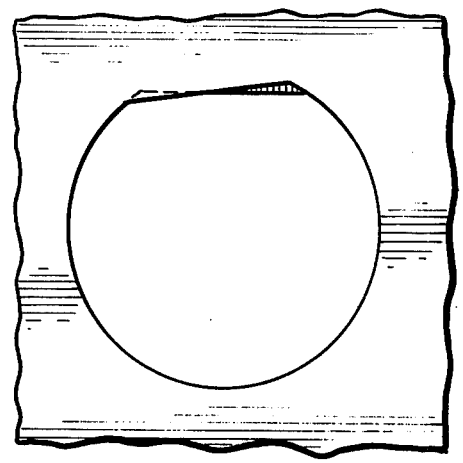
Figure 7C:
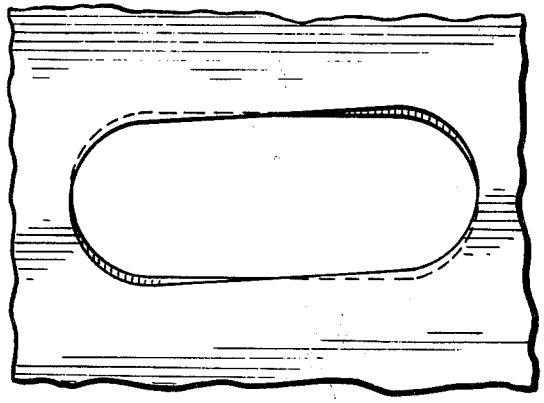
Figure 7F:
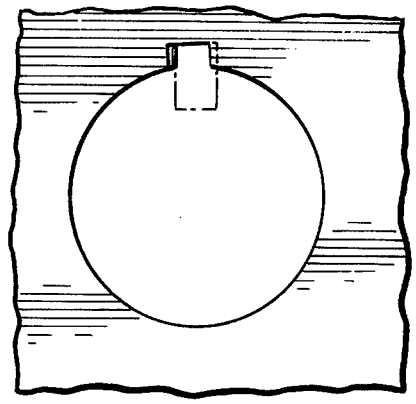

Although a square shaft, as depicted in the embodiment of FIGS. 1 to 6 inclusive, is a commonly encountered non-circular shape, other shapes more or less common which are non-circular, or circular suitably interrupted, may also be used. A few of these are illustrated in FIGS. 7a–7b, for example, hexagonal, triangular, obround, elliptical, circular with milled flat, and circular with protruding key. The keyed and multifaceted hexagonal or octagonal forms, taken together, also suggest a splined shaft for the purpose.

In the particular commercial application depicted in FIGS. 1 to 4, the nature of the application is the transmission of torsional load to or by the arm 12 to the extent that unequal loading of the two similar chair linkages may be experienced, and incidentally to secure the arm axially of the shaft as well, capable of resisting axial load. Torsional load in that application may also result from the utilization of the cross shaft as the driving connection to other parts of the chair having coordinate movement.

In other applications, the assembly of the invention may be used, for example, to secure a shaft non-rotationally in a mounting, and to affix to the shaft one or more load-receiving members in an application where the assembly is essentially torque-resisting rather than torque-transmitting.

Basically, the connection made between the load member and the shaft by means of the torsionally shearing grip of the joined load member and attaching member provides a secure attachment of the load member to the shaft. While not so limited, the arrangement is especially advantageous where the load member is relatively thin in relation to the cross-sectional dimension of the shaft, as, for example, when the load member is formed of sheet metal.

From the foregoing detailed description it will be understood that the basic requirements are for a shaft of non-circular cross section, and for load and attaching members which have limited rotational or non-rotational fits with the shaft, and which are secured to each other after having been rotated on the shaft in opposite directions with sufficient force to resiliently deform at least one of the three elements of the assembly. The oppositely rotated members are then fastened together to maintain the resilient deformation which provides the shearing torsional grip of the members upon the shaft. The fastener may be a screw or rivet or may be interlocked tabs, or the two members may be welded together in permanent assembly.

The features of the invention believed new and patentable are set forth in the appended claims.

I claim:

1. The assembly with a shaft of a load member capable of transmitting torque to and from said shaft in both directions about the axis of the shaft and of transmitting axial thrust to and from the shaft in both directions axially of the shaft in which a. the shaft at the site of said assembly has a non-circular cross-sectional configuration, a. and the load member has therein an aperture received on said shaft to transmit to said shaft a torque in at least one direction by engagement therewith at said aperture, the assembly also including an attaching member mounted on said shaft adjacent to said load member and capable of transmitting torque to said shaft in the opposite direction by engagement of said attaching member with said shaft, said load member and said attaching member being biased in said opposite torque-transmitting directions rotationally about the axis of said shaft with sufficient force to deform at least one of said shaft and said members at the site of contact between such member and shaft, said members being fastened together while so biased to maintain the grip of said members upon said shaft.

2. The assembly of claim 1 in which the load and attaching members abut each other on said shaft.

3. The assembly of claim 1 in which the load member is relatively thin in relation to the cross-sectional dimension of the shaft, and the attaching member is in facing contact therewith.

4. The assembly of claim 1 in which the load member and the attaching member are both relatively thin in relation to the cross-sectional dimension of the shaft, each member has an aperture of the same configuration as said shaft as said assembly site and has a slip-fit therewith prior to said deformation, and the two members are fastened together by a fastener passed through aligned holes in the members.

* * * * *

UNITED STATES PATENT AND TRADEMARK OFFICE
CERTIFICATE OF CORRECTION

PATENT NO. : 4,025,210

DATED : May 24, 1977

INVENTOR(S) : Carl B. Johnson

It is certified that error appears in the above-identified patent and that said Letters Patent are hereby corrected as shown below:

Column 1, line 53: "and $\underline{b}$" should read "to $\underline{f}$".

Signed and Sealed this sixteenth Day of August 1977

[SEAL]

Attest:

RUTH C. MASON
Attesting Officer

C. MARSHALL DANN
Commissioner of Patents and Trademarks